US011440150B1

(12) United States Patent
Chen

(10) Patent No.: US 11,440,150 B1
(45) Date of Patent: Sep. 13, 2022

(54) TOOL HOLDER LOCKING DEVICE

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/345,162

(22) Filed: Jun. 11, 2021

(51) Int. Cl.
*B23Q 3/157* (2006.01)
*B23Q 3/155* (2006.01)

(52) U.S. Cl.
CPC ........... *B23Q 3/15536* (2016.11); *B23Q 2003/15527* (2016.11); *Y10T 483/18* (2015.01); *Y10T 483/1809* (2015.01)

(58) Field of Classification Search
CPC .......... Y10T 483/1809; Y10T 483/18; B23Q 2003/15527; B23Q 3/15536; B23Q 2003/155453; B23Q 3/15553; B23Q 3/155–3/15793; B25H 3/04; B25H 3/003
USPC ...................................... 483/59, 58
See application file for complete search history.

(56) References Cited

U.S. PATENT DOCUMENTS

| 3,256,600 A | * | 6/1966 | Swanson | B23Q 3/15766 483/66 |
| 3,568,849 A | * | 3/1971 | Hutchison | B23Q 3/15536 483/59 |
| 3,604,565 A | * | 9/1971 | Freeman | B23Q 3/15536 248/314 |
| 3,818,580 A | * | 6/1974 | Pagella | B23Q 3/1574 483/66 |
| 3,822,790 A | * | 7/1974 | Armour | F16B 9/056 279/23.1 |
| 3,911,540 A | * | 10/1975 | Johnson | B23Q 3/15506 483/2 |

(Continued)

FOREIGN PATENT DOCUMENTS

CN 114055223 A * 2/2022
DE 4007072 A1 * 9/1991
(Continued)

OTHER PUBLICATIONS

Machine Translation of SU 1135593 A1, which SU '593 was published Jan. 1985.*

(Continued)

*Primary Examiner* — Erica E Cadugan
(74) *Attorney, Agent, or Firm* — Birch, Stewart, Kolasch & Birch, LLP

(57) ABSTRACT

A tool holder locking device has a base, a horizontal support mounted on the base to hold a first tool holder, and a vertical support mounted on the base to vertically hold a second tool holder. The horizontal support has a supporting block having a holding cavity and an engaging rib radially protruding from the holding cavity to engage with a gripper groove of the first tool holder, a first positioning member fixed on the supporting block to engage with a positioning notch of the first tool holder, and a second member fixed on the supporting block to engage with an orientation notch of the first tool holder. The vertical support has a supporting sleeve and a positioning block mounted on a bottom of the supporting sleeve and extending along a radial direction of the supporting sleeve to engage with two driving grooves of the second tool holder.

19 Claims, 11 Drawing Sheets

(56) References Cited

U.S. PATENT DOCUMENTS

2003/0130101 A1*  7/2003  Hwang .............. B23Q 3/15722
                                                    211/1.53

FOREIGN PATENT DOCUMENTS

| DE | 20017808 U1 | * | 12/2000 |
| DE | 202007000801 U1 | * | 4/2007 |
| DE | 202009000804 U1 | * | 4/2010 |
| DE | 202017002686 U1 | * | 8/2017 |
| KR | 10-2014-0054801 A | * | 5/2014 |
| SU | 1135593 A1 | * | 1/1985 |

OTHER PUBLICATIONS

Machine Translation of DE 20017808 U1, which DE '808 was published Dec. 2000.*
Machine Translation of CN 114055223-A, which CN '223 was published Feb. 2022.*
Machine Translation of DE 202017002686 U1, which DE '686 was published Aug. 2017.*
Machine Translation of KR 10-2014-0054801-A, which KR '801 was published May 2014.*
Machine Translation of DE 202007000801 U1, which DE '801 was published Apr. 2007.*
Machine Translation of DE 4007072-A1, which DE '072 was published Sep. 1991.*
Machine Translation of DE 202009000804-U1, which DE '804 was published Apr. 2010.*

* cited by examiner

TOOL HOLDER LOCKING DEVICE

BACKGROUND OF THE INVENTION

1. Field of the Invention

The present invention relates to a tool holder locking device, and more particularly to a tool holder locking device comprising a horizontal support and a vertical support to stably hold tool holders.

2. Description of Related Art

A conventional tool holder locking device is a device to assist changing and retrieval of a tool clamped in a tool holder. The conventional tool holder locking device may comprise a vertical support to vertically hold a tool holder and a horizontal support to horizontally hold a tool holder.

The tool holders are manufactured under various standards. One of the tool holders based on HSK standard comprises multiple positioning notches, a gripper groove, and multiple driving grooves. The positioning notches are recessed in an annular surface of the tool holder for positioning an angle of the tool holder relative to a tool machine. Because the tool holder may have two positioning notches respectively located at two diametrical opposite sides thereof, the tool holder may have an orientation notch located near one of the positioning notches for a user to confirm a connecting direction of the tool holder relative to the tool machine and to avoid the tool holder getting connected to the tool machine in a wrong direction. The gripper groove is radially recessed in a flange of the tool holder to connect with an automatic tool changer. The driving grooves are recessed in an end surface of the tool holder to connect with driving keys on a spindle of the tool machine, and thereby torque of the tool holder can be increased for heavy cutting.

The horizontal support of the conventional tool holder locking device substantially comprises a horizontal support block having a semicircular cavity recessed in a top of the horizontal support block and a positioning member mounted in and protruding from the semicircular cavity. A tool holder is horizontally held in the semicircular cavity and is engaged with the positioning member via an engagement between the positioning member and one of the positioning notches formed in the annular surface of the tool holder. The tool holder is thus prevented from being rotated during fastening or detaching of a nut from the tool holder.

However, because the horizontal support of the conventional tool holder locking device is engaged with the tool holder via the engagement between the positioning member and one of the positioning notches in the annular surface of the tool holder, the tool holder may not be stably held in and engaged with the horizontal support. The tool holder is easily slipped to disengage from the positioning member during detaching or fastening of the nut.

The vertical support of the conventional tool holder locking device substantially comprises a vertical supporting sleeve and a positioning member mounted on a top of the supporting sleeve. The tool holder is vertically held in the vertical supporting sleeve and is engaged with the positioning member via an engagement between the positioning member and the positioning notches formed in the annular surface of the tool holder. So the tool holder is prevented from being rotated during fastening or detaching of a nut from the tool holder.

However, because the positioning member of the vertical support is engaged with the tool holder via the engagement between the positioning member and the positioning notches formed in the annular surface of the tool holder, the engagement between the positioning member and the tool holder is not strong enough, and the tool holder is easily moved relative to the vertical support during detaching or fastening of a nut on the tool holder.

To overcome the shortcomings, the present invention tends to provide a tool holder locking device to mitigate or obviate the aforementioned problems.

SUMMARY OF THE INVENTION

The main objective of the present invention is to provide a tool holder locking device comprising a horizontal support and a vertical support to stably hold tool holders.

The tool holder locking device comprises a base, a horizontal support mounted on the base to horizontally hold a first tool holder, and a vertical support mounted on the base to vertically hold a second tool holder.

The first tool holder has a first end portion and a second end portion respectively located at two opposite ends of the first tool holder, a flange formed between the first end portion and the second end portion and protruding from an annular surface of the first tool holder, a positioning notch recessed in the flange, an orientation notch recessed in the flange and spaced from the positioning notch at an angular interval, and a gripper groove radially recessed in the flange.

The horizontal support has a supporting block, a first positioning member, and a second positioning member. The supporting block is fixed on the base and has a first end surface, a second end surface opposite to the first end surface, a holding cavity, and an engaging rib. The holding cavity is U-shaped, extends from the first end surface toward the second end surface, and has a top opening formed in a top of the supporting block, a concave curved bottom surface, and two cavity side surfaces respectively extending from two top edges of the concave curved bottom surface. The engaging rib radially protrudes from the holding cavity, has two ends respectively extending to the two cavity side surfaces of the holding cavity, and corresponds to the gripper groove of the first tool holder in position and in size to engage with the gripper groove of the first tool holder. The first positioning member is fixed on the supporting block, protrudes from the concave curved bottom surface of the holding cavity, and corresponds to the positioning notch of the first tool holder in position and in size to engage with the positioning notch of the first tool holder. The second positioning member is fixed on the supporting block, protrudes from the concave curved bottom surface of the holding cavity, and corresponds to the orientation notch of the first tool holder in position and in size to engage with the orientation notch of the first tool holder.

The second tool holder has a first end portion and two driving grooves recessed in an end of the first end portion of the second tool holder and located at two diametrical opposite sides of the second tool holder and communicating with each other.

The vertical support has a supporting sleeve and a positioning block. The supporting sleeve is fixed on the base and has a top, a bottom, and a sleeve hole vertically formed through the supporting sleeve. The positioning block is fixed on the bottom of the supporting sleeve and extends along a radial direction of the supporting sleeve and across two diametrical opposite sides of the sleeve hole.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
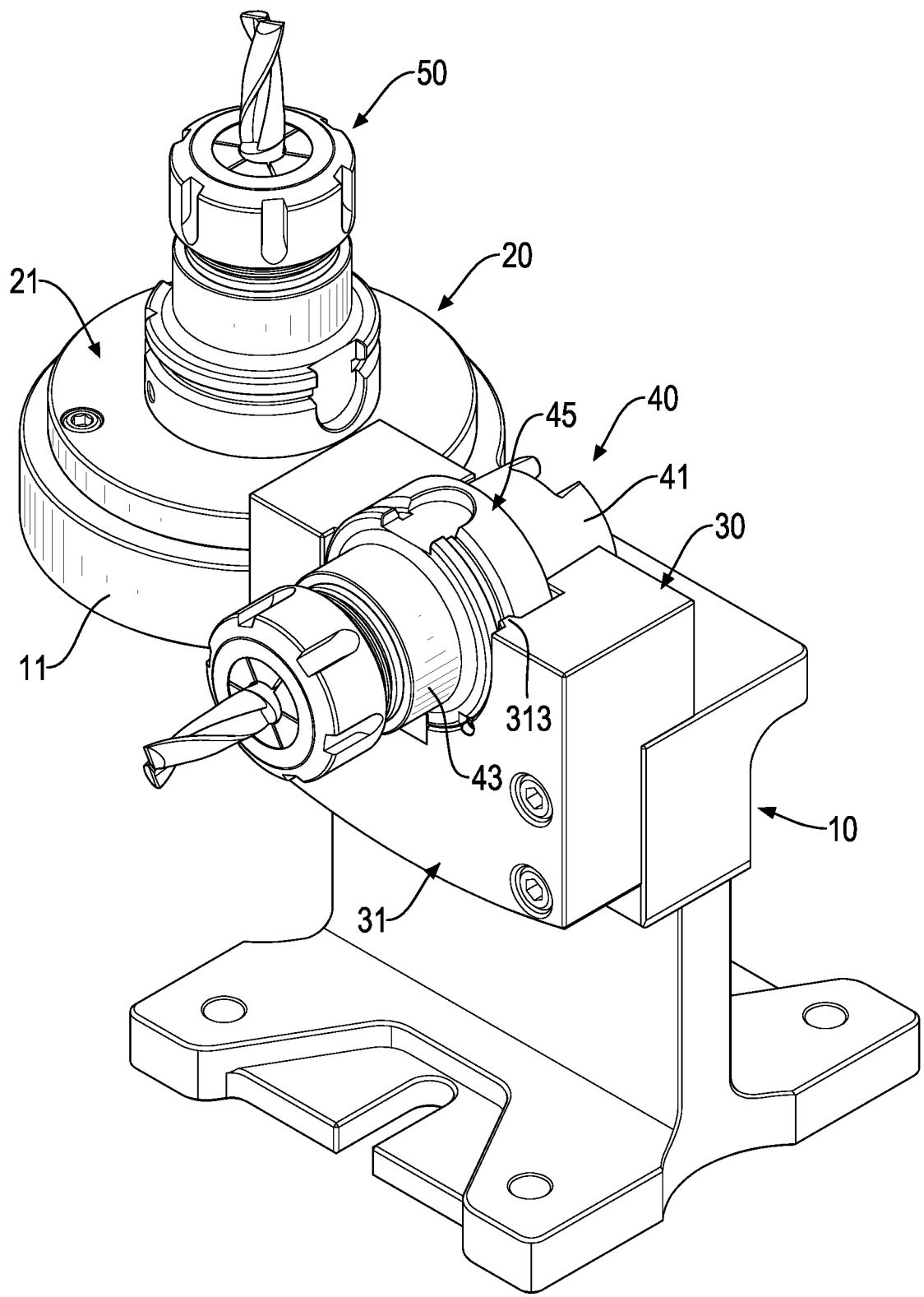
FIG. 1 is an operational perspective view of a tool holder locking device in accordance with the present invention showing that a first tool holder is held in a horizontal support of the tool holder locking device and a second tool holder is held in a vertical support of the tool holder locking device.

With reference to FIG. 1, a tool holder locking device in accordance with the present invention comprises a base 10, a horizontal support 30, and a vertical support 20.

Figure 3:
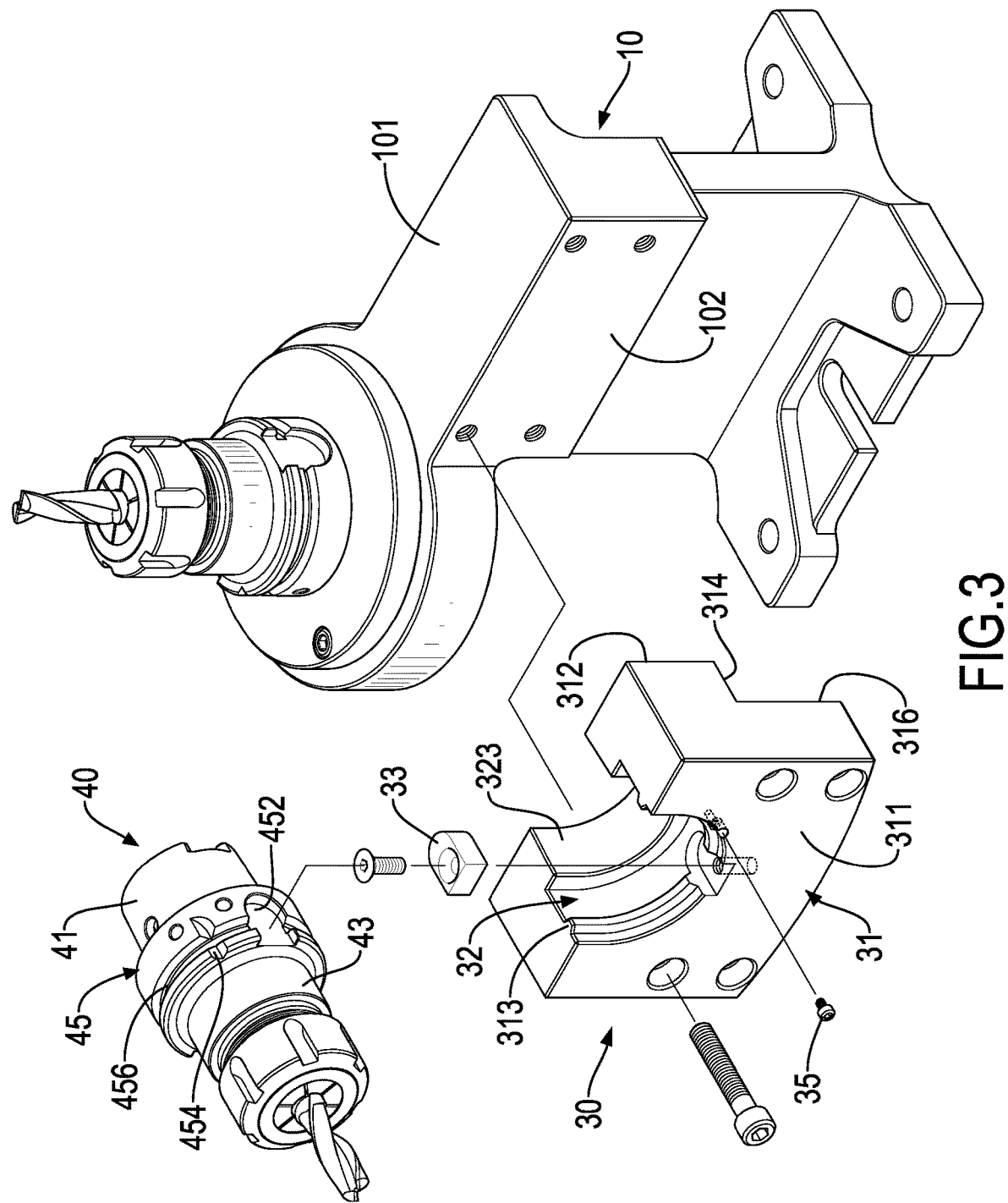
FIG. 3 is a partially exploded and operational perspective view of the tool holder locking device in FIG. 1.
Figure 4:
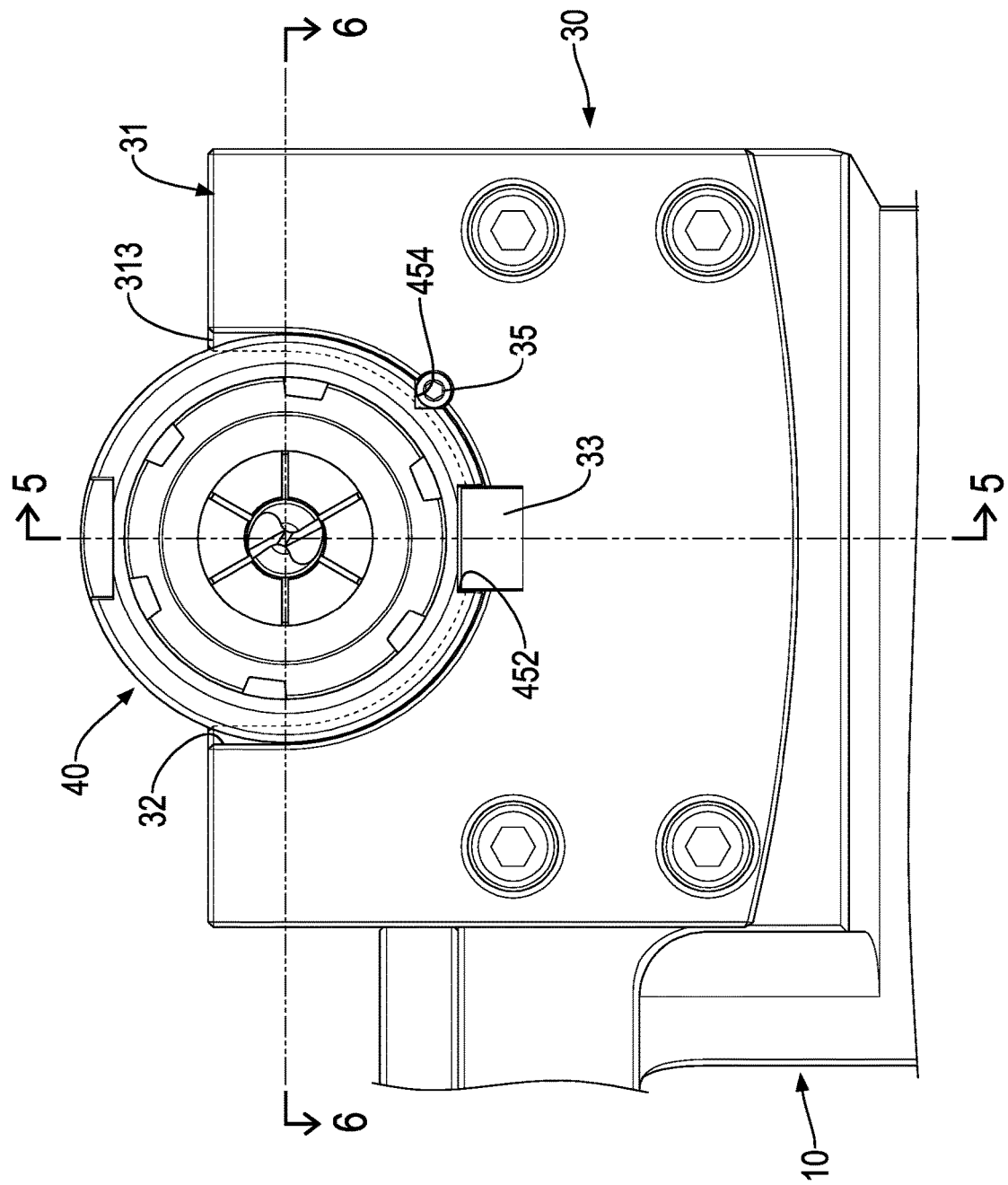
FIG. 4 is an enlarged operational front side view of the tool holder locking device in FIG. 1.

With reference to FIGS. 1, 3, and 4, the horizontal support 30 is mounted on the base 10 to horizontally hold a first tool holder 40. The first tool holder 40 has a first end portion 41, a second end portion 43, a flange 45, a positioning notch 452, an orientation notch 454, and a gripper groove 456. The first end portion 41 and the second end portion 43 are respectively formed on two opposite ends of the first tool holder 40. The first end portion 41 is conical and has an external diameter gradually smaller toward an end of the first end portion 41 away from the second end portion 43.

The flange 45 is formed between the first end portion 41 and the second end portion 43 and radially protrudes from an annular surface of the first tool holder 40. The flange 45 has an external diameter being larger than external diameters of the first end portion 41 and the second end portion 43 and two end surfaces respectively facing the first end portion 41 and the second end portion 43. The positioning notch 452, the orientation notch 454, and the gripper groove 456 are recessed in the flange 45. The positioning notch 452 and the orientation notch 454 are arranged at an angular interval and longitudinally extend along the first tool holder 40. The positioning notch 452 has a round end near the first end portion 41. The gripper groove 456 is formed around and radially recessed in the flange 45 and communicates with the positioning notch 452 and the orientation notch 454. The gripper groove 456 has a width between two opposite side surfaces gradually larger from inward to outward thereof.

With reference to FIGS. 2 to 6, the base 10 has a base top surface 101 and a base side surface 102. The horizontal support 30 has a supporting block 31, a first positioning member 33, and a second positioning member 35.

The supporting block 31 is fixed on the base 10 and has a first end surface 311, a second end surface 312, a holding cavity 32, and an engaging rib 313. The first end surface 311 and the second end surface 312 are respectively formed in two opposite ends of the supporting block 31. The holding cavity 32 is U-shaped, extends from the first end surface 311 toward the second end surface 312, and has a top opening formed in a top of the supporting block 31, a concave curved bottom surface, and two cavity side surfaces respectively extending from two top edges of the concave curved bottom surface. The concave curved bottom surface is semicircular. The two cavity side surfaces extend vertically and upwardly. The engaging rib 313 radially protrudes from the holding cavity 32 and has two ends respectively extended to the two cavity side surfaces of the holding cavity 32. The engaging rib 313 corresponds to the gripper groove 456 in position and in size to engage with the gripper groove 456. The engaging rib 313 is spaced from the first end surface 311 and the second end surface 312. The engaging rib 313 has two side walls being gradually away from each other from upper edges of the two side walls of the engaging rib 313 and corresponds to the gripper groove 456 in shape and in size.

The first positioning member 33 is fixed on the supporting block 31, protrudes from the concave curved bottom surface of the holding cavity 32, and corresponds to the positioning notch 452 of the first tool holder 40 in position and in size to engage with the positioning notch 452. The second positioning member 35, fixed on the supporting block 31, protrudes from the concave curved bottom surface of the holding cavity 32, is spaced from the first positioning member 33 at an angular interval, and corresponds to the orientation notch 454 of the first tool holder 40 in position and in size to engage with the orientation notch 454.

The first positioning member 33 is a block and is fixed on the supporting block 31 via a bolt. The first positioning member 33 extends from the first end surface 311 toward the second end surface 312, has a round end near the second end surface 312, and corresponds to the positioning notch 452 of the first tool holder 40 in shape and in size. The holding cavity 32 has an insertion groove recessed in the bottom surface of the holding cavity 32 and corresponding to the first positioning member 33 in shape and in size for receiving the first positioning member 33 inserted therein. The second positioning member 35 extends from the engaging rib 313 toward the first end surface 311 of the supporting block 31. The second positioning member 35 may be a bolt screwed into the engaging rib 313.

Preferably, the holding cavity 32 has a stage 323 located near the second end surface 312 and protruding inwardly. The engaging rib 313 is located between the first end surface 311 of the supporting block 31 and the stage 323 of the holding cavity 32. The first end portion 41 of the first tool holder 40 is held on the stage 323 to enhance the stability of the horizontal support 30 to hold the first tool holder 40. Preferably, the stage 323 has a concave curved bottom surface having a diameter gradually larger from the second end surface 312 toward the first end surface 311 and corresponds to the conical surface of the first end portion 41 of the first tool holder 40 in shape and in size to increase an abutting area of the stage 323 to hold the first end portion 41 of the first tool holder 40.

Figure 2:
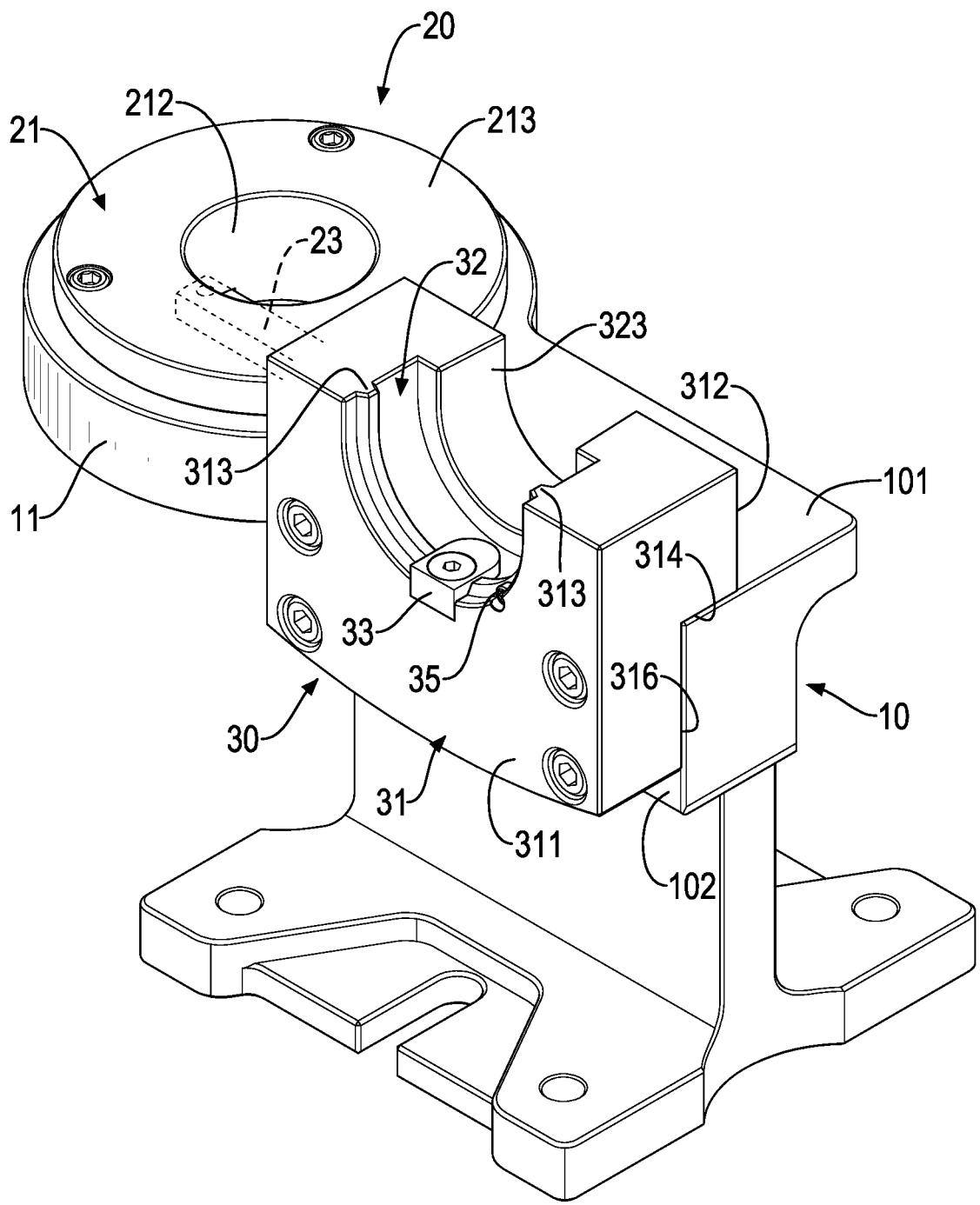
FIG. 2 is a perspective view of the tool holder locking device in FIG. 1.
Figure 5:
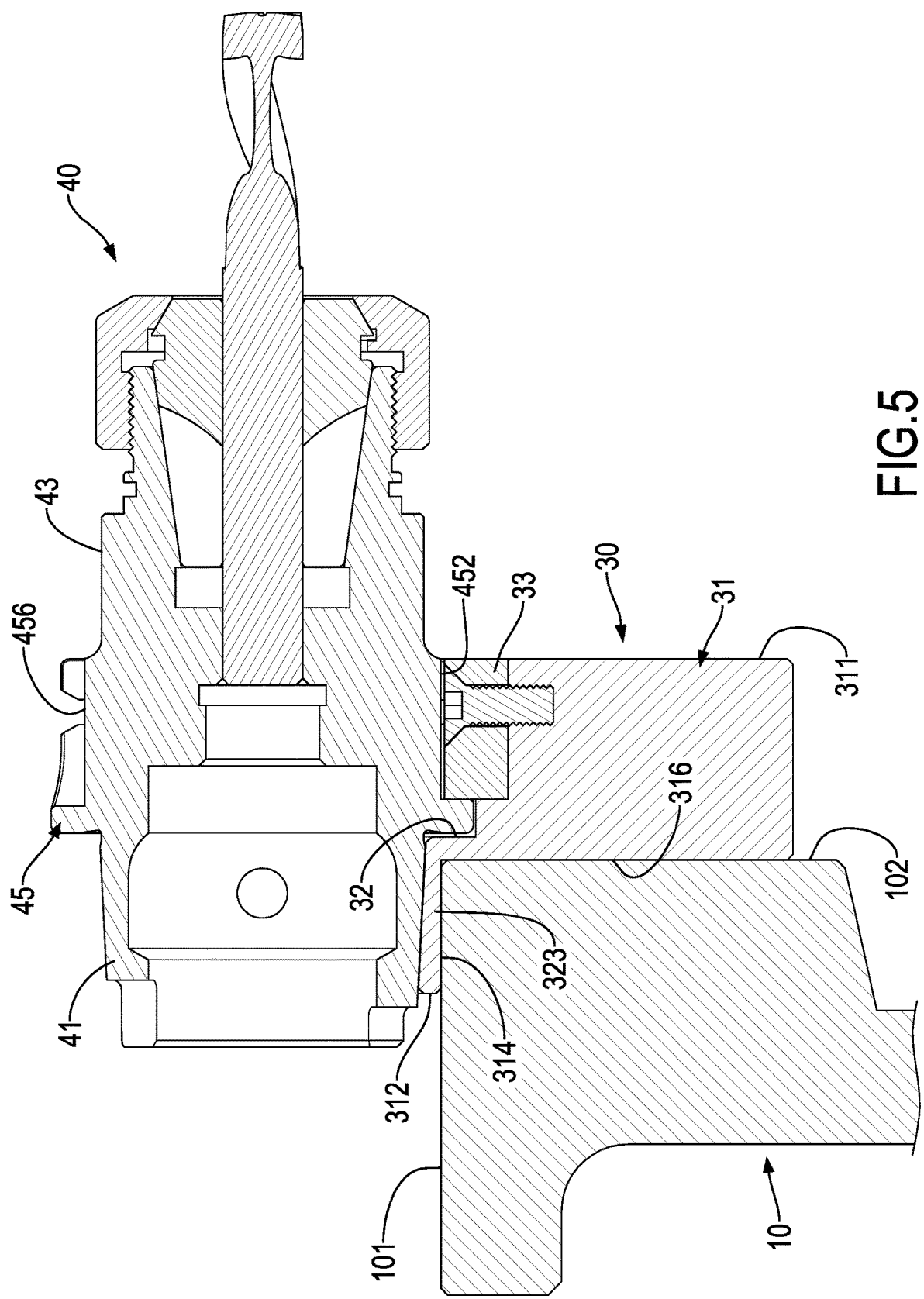
FIG. 5 is an enlarged operational cross sectional side view in partial section of the tool holder locking device along line 5-5 in FIG. 4.
Figure 6:
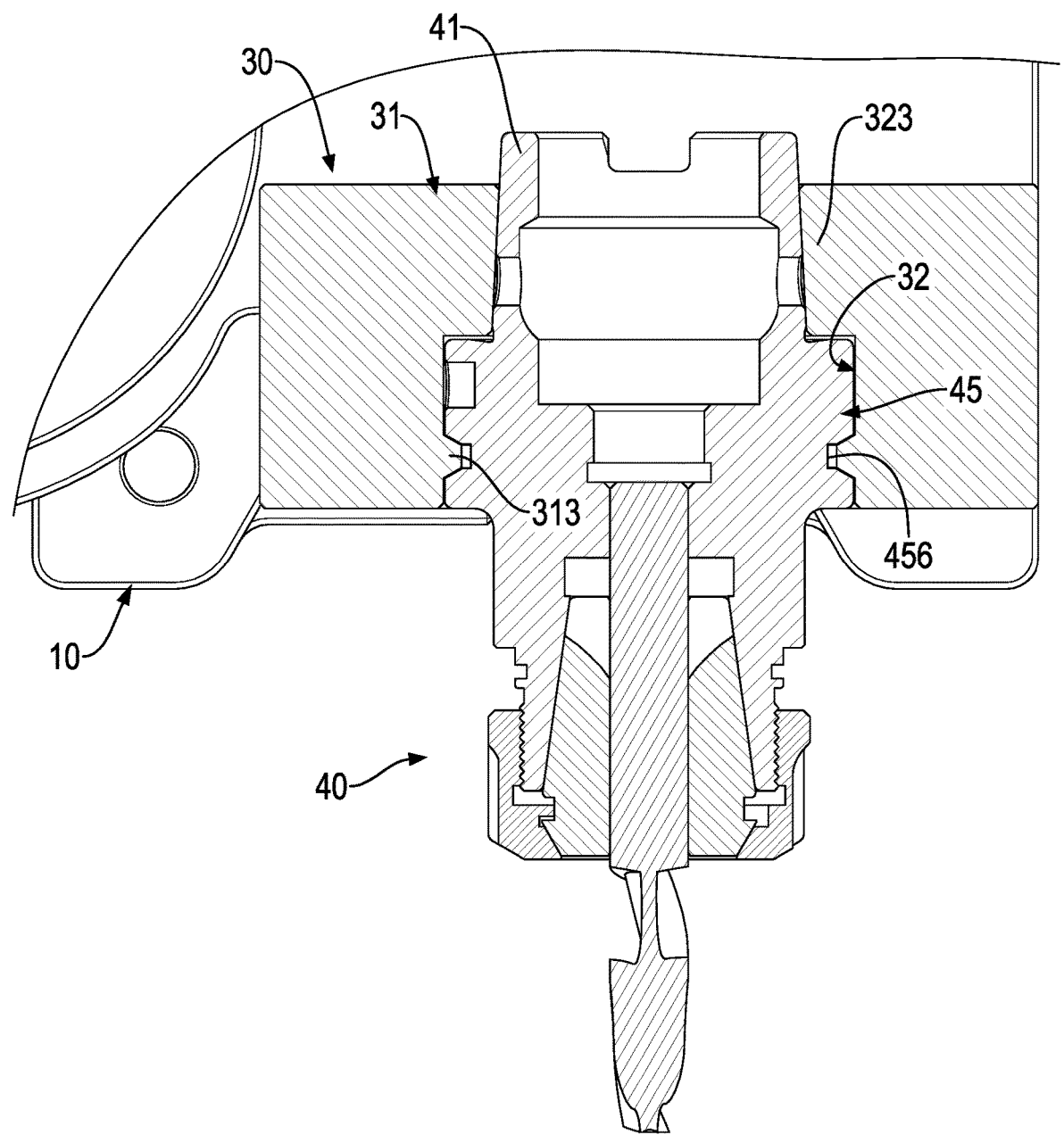
FIG. 6 is an enlarged operational cross sectional top view in partial section of the tool holder locking device along line 6-6 in FIG. 4.

With reference to FIGS. 2, 3, and 5, the supporting block 31 has an abutting portion having an abutting bottom surface 314 and an abutting side surface 316. The abutting bottom surface 314 extends from a bottom of the second end surface 312 toward the first end surface 311. The abutting side surface 316 extends downwardly from an edge of the abutting bottom surface 314 near the first end surface 311. The abutting bottom surface 314 is held on the base top surface 101 of the base 10. The abutting side surface 316 abuts against the base side surface 102 of the base 10. The supporting block 31 is stably fixed on the base 10 via the abutting portion of the supporting block 31 held on the base top surface 101 of the base 10 and abutting against the base side surface 102 of the base 10.

With reference to FIGS. 3 to 6, the positioning notch 452 is turned to face downward to place the first tool holder 40 in the holding cavity 32. The positioning notch 452 of the first tool holder 40 is engaged with the first positioning member 33, the orientation notch 454 of the first tool holder 40 is engaged with the second positioning member 35, and the gripper groove 456 is engaged with the engaging rib 313 to stably hold the first tool holder 40 on the horizontal support 30.

Because the horizontal support 30 has a first positioning member 33 and a second positioning member 35 to engage with the first tool holder 40 to increase engaging portions between the horizontal support 30 and the first tool holder 40, such that the first tool holder 40 is not easily rotated relative to the supporting block 31.

The engaging rib 313 is engaged with the gripper groove 456 of the first tool holder 40 to prevent a longitudinal movement of the first tool holder 40.

The holding cavity 32 has two cavity side surfaces to increase the depth of the holding cavity 32, and the engaging ribs 313 each has two ends respectively extending to the two cavity side surfaces of the holding cavity 32 to prevent the first tool holder 40 from easily disengaging from the holding cavity 32 of the horizontal support 30.

The holding cavity 32 has the stage 323 to hold the first end portion 41 of the first tool holder 40 to enhance stability of holding the first tool holder 40 on the horizontal support 30.

In addition, the supporting block 31 is mounted on the base 10 via the abutting bottom surface 314 held on the base top surface 101 of the base 10 and the abutting side surface 316 abutting against the base side surface 102 of the base 10 to stably fixed the supporting block 31 on the base 10.

Figure 7:
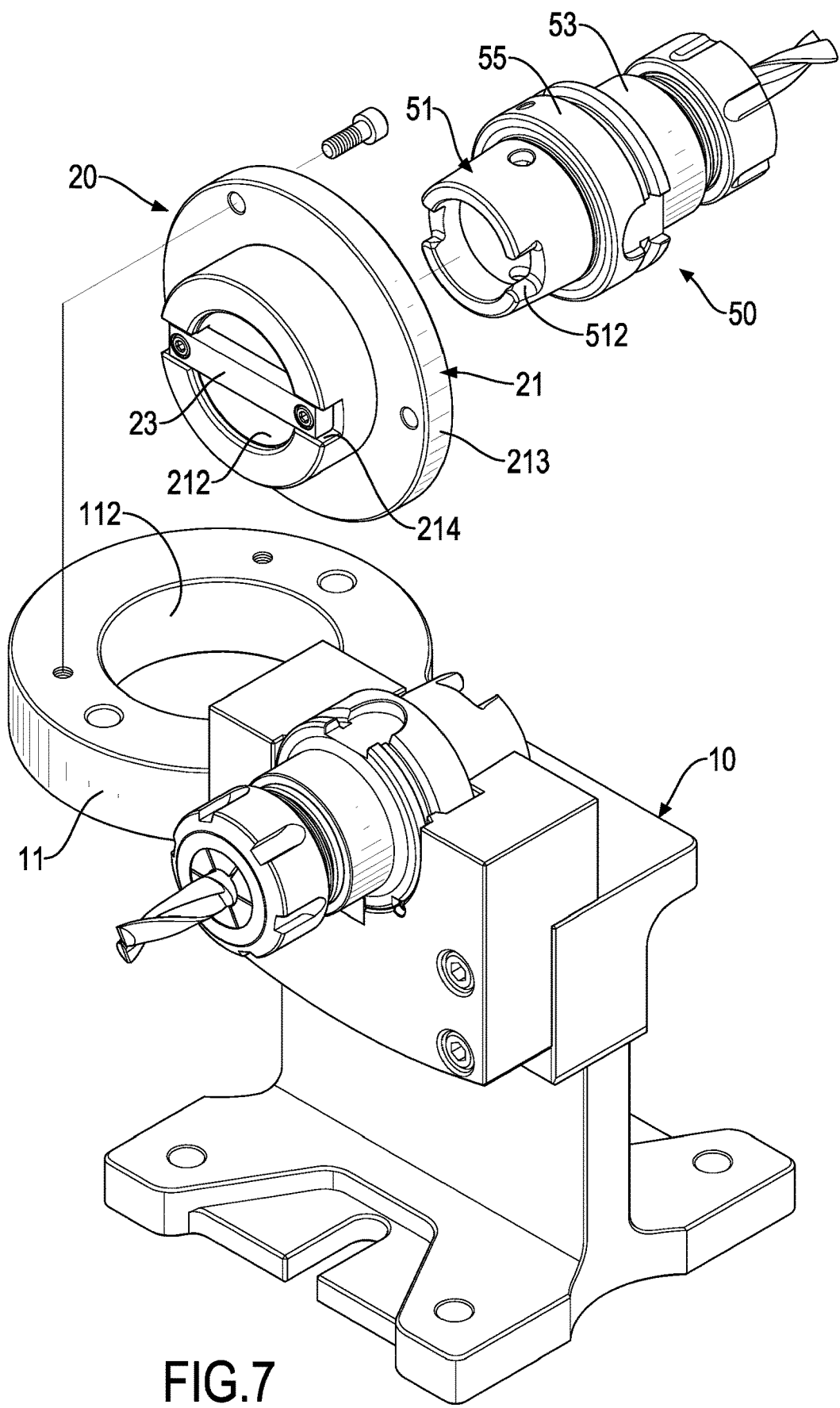
FIG. 7 is another partially exploded and operational perspective view of the tool holder locking device in FIG. 1.
Figure 9:
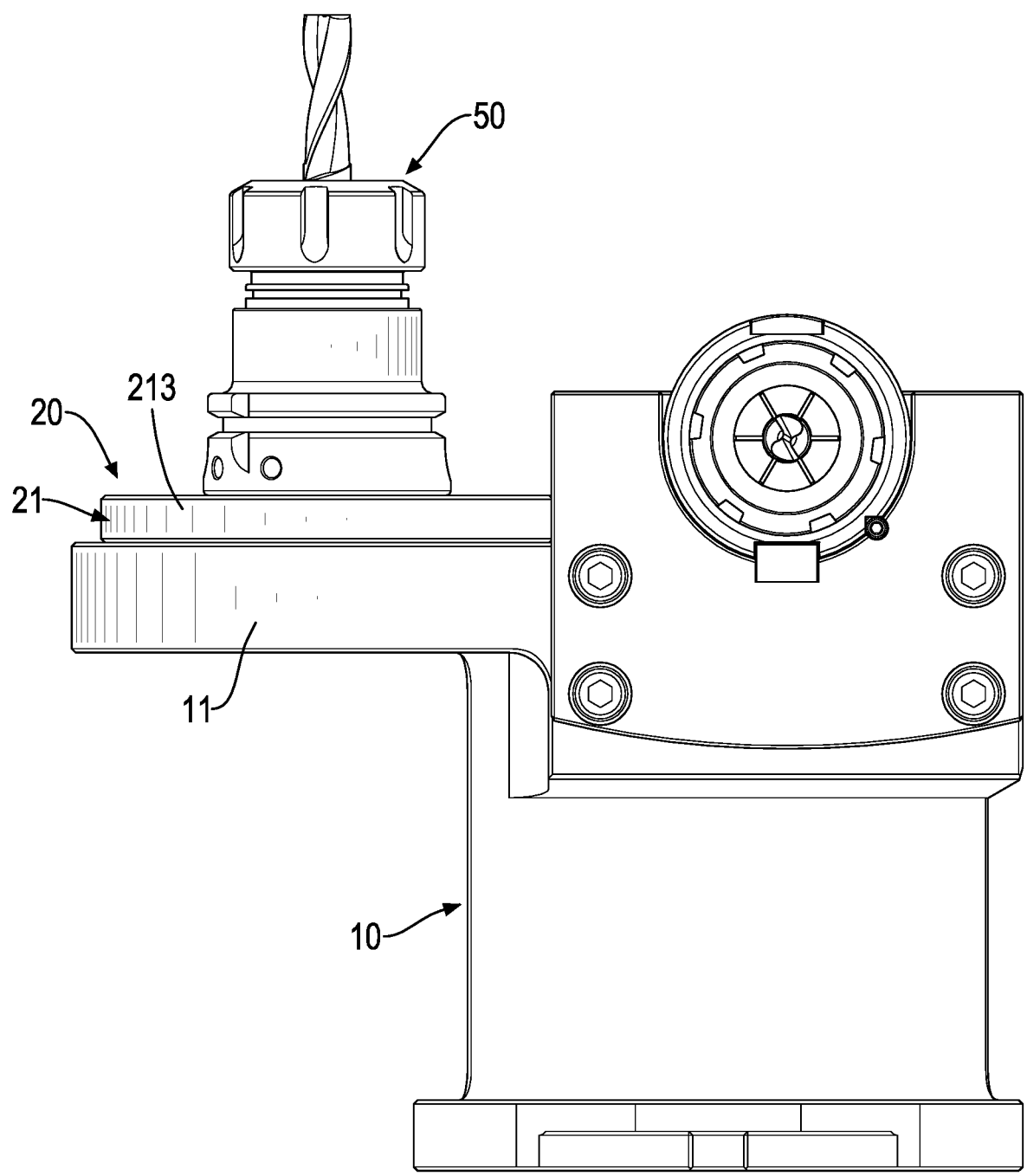
FIG. 9 is an operational front view of the tool holder locking device in FIG. 1.

With reference to FIGS. 1, 7, and 9, the vertical support 20 is adapted to hold a second tool holder 50. With reference to FIG. 3, the second tool holder 50 has a first end portion 51, a second end portion 53, a flange 55, and two driving grooves 512. The first end portion 51 and the second end portion 53 are respectively formed on two opposite ends of the second tool holder 50. The first end portion 51 is conical and has an external diameter gradually smaller toward an end of the first end portion 51 away from the second end portion 53. The flange 55 is formed between the first end portion 51 and the second end portion 53 and radially protrudes from an annular surface of the second tool holder 50. The flange 55 has an external diameter being larger than external diameters of the first end portion 51 and the second end portion 53 and two end surfaces respectively facing the first end portion 51 and the second end portion 53. The two driving grooves 512 are recessed in an end of the first end portion 51 toward the second end portion 53, are respectively located at two diametrically opposite sides of the second tool holder 50, and communicate with each other.

Figure 8:
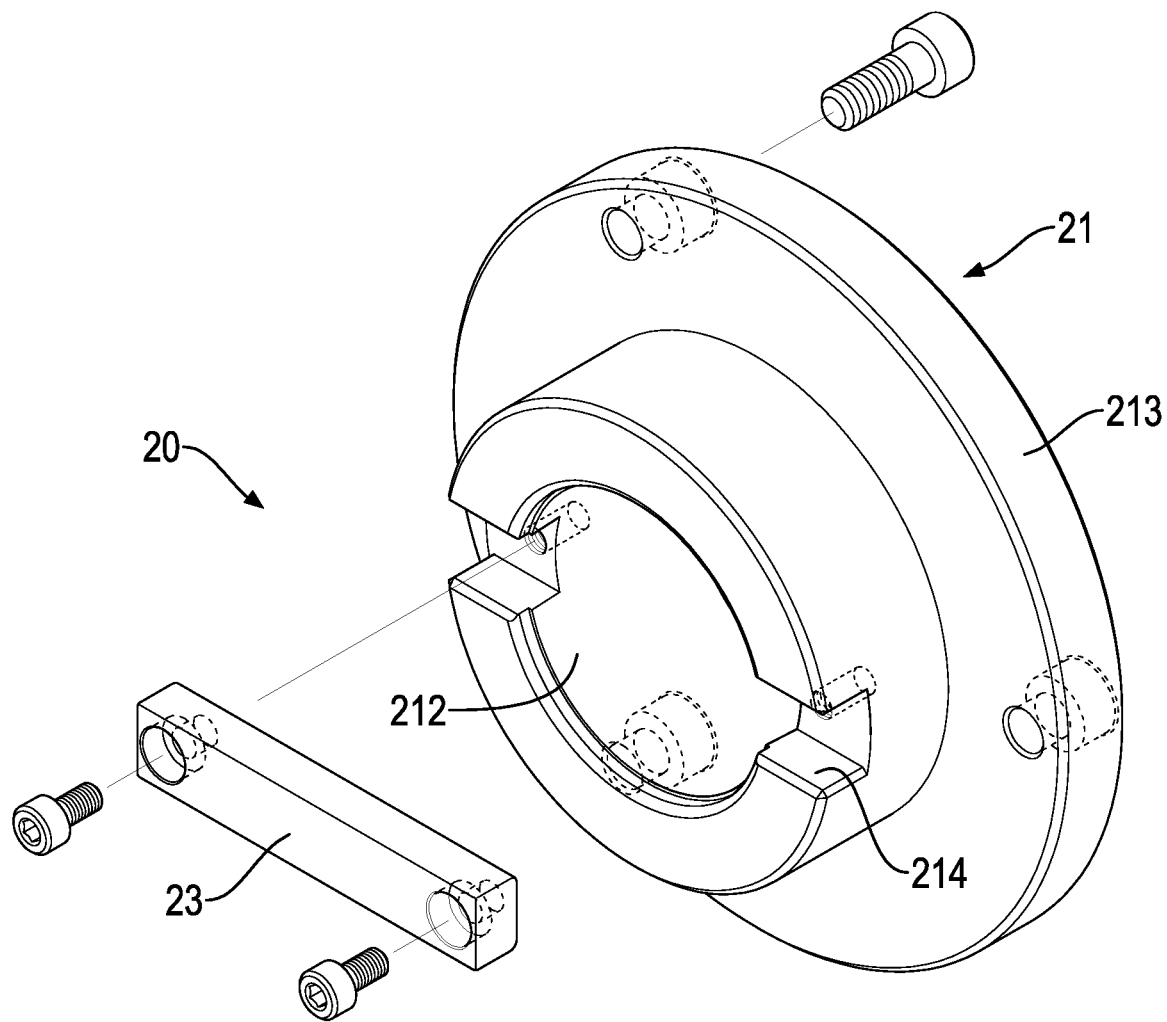
FIG. 8 is an exploded perspective view of the vertical support of the tool holder locking device in FIG. 7.

With reference to FIGS. 2, 7, and 8, the vertical support 20 is mounted on the base 10 and has a supporting sleeve 21 and a positioning block 23.

The supporting sleeve 21 is fixed on the base 10 and has a sleeve hole 212 vertically formed through the supporting sleeve 21. The positioning block 23 is an elongate block, is fixed on a bottom end of the supporting sleeve 21, and extends along a radial direction of the supporting sleeve 21 and across two diametrical opposite sides of the sleeve hole 212.

Figure 10:
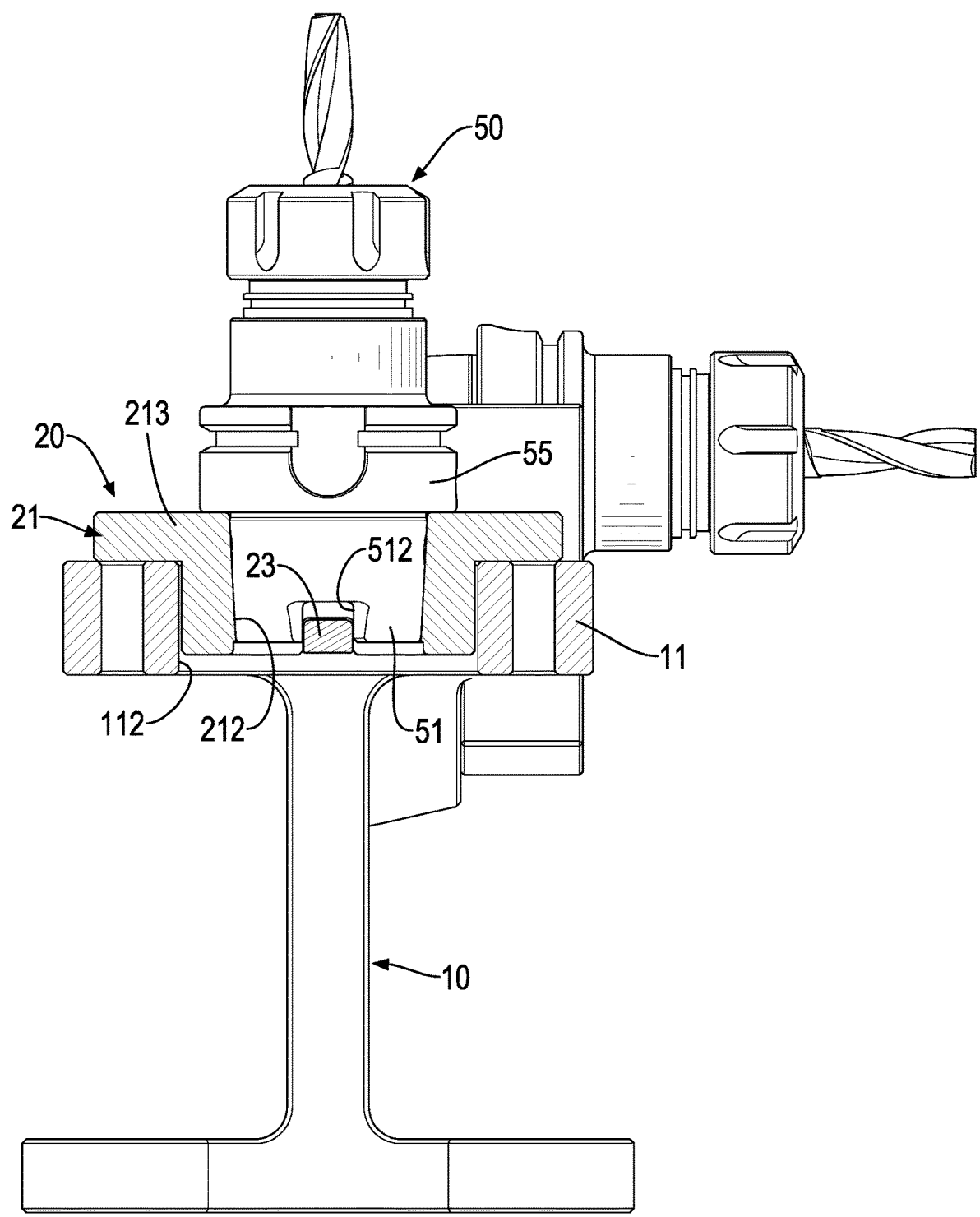
FIG. 10 is an operational side view in partial section of the tool holder locking device in FIG. 1.
Figure 11:
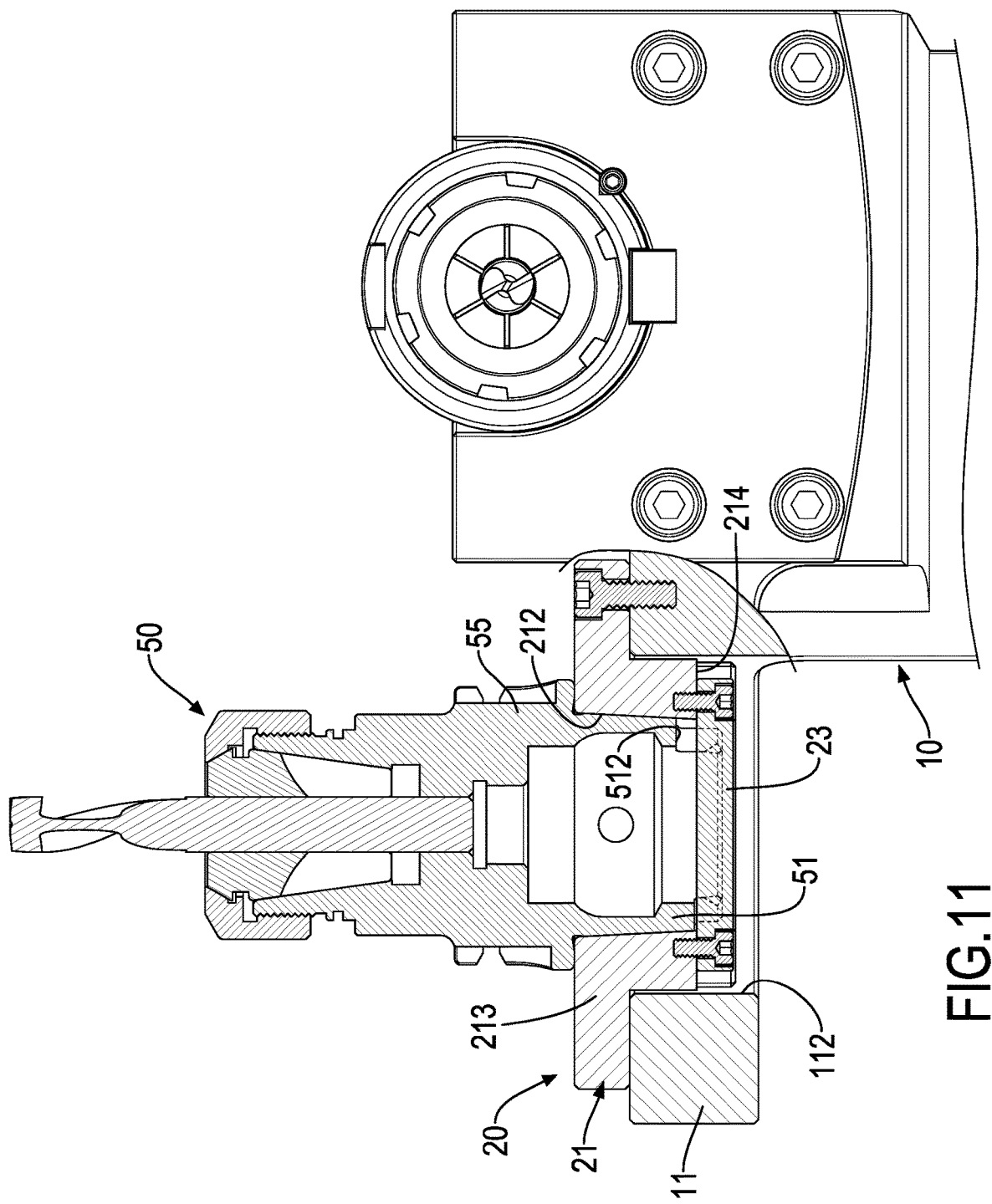
FIG. 11 is an enlarged operational front side view in partial section of the tool holder locking device in FIG. 1.

The supporting sleeve 21 has a sleeve flange 213 formed on a top thereof. The sleeve flange 213 is held on the base 10 and is fixed on the base 10 via bolts. Preferably, the base 10 has a sleeve holder 11 having a holding hole 112 vertically formed through the sleeve holder 11. With reference to FIGS. 9 to 11, the supporting sleeve 21 is inserted in the holding hole 112 and the sleeve flange 213 is held on a top of the sleeve holder 11.

With reference to FIGS. 7, 8, and 11, the supporting sleeve 21 has two insertion notches 214 recessed in the bottom thereof, are respectively located at the two diametrical opposite sides thereof, and communicate with the sleeve hole 212. The positioning block 23 has two ends respectively inserted in the two insertion notches 214 and fixed on the supporting sleeve 21 via bolts.

With reference to FIGS. 10 and 11, preferably, the sleeve hole 212 of the supporting sleeve 21 is a conical hole having a diameter gradually smaller from the top to the bottom of the supporting sleeve 21, and corresponds to the first end portion 51 of the second tool holder 50 in shape and in size.

With reference to FIGS. 7, 10, and 11, the first end portion 51 of the second tool holder 50 is turned to face downward and is inserted in the sleeve hole 212 of the supporting sleeve 21, and the driving grooves 512 are engaged with the positioning block 23. Because the positioning block 23 is engaged with the driving groove 512 in the end of the first end portion 51 to increase engagement between the second tool holder 50 and the vertical support 20 to stably hold the second tool holder 50.

In addition, the two ends of the positioning block 23 are inserted in the two insertion notches 214 to stably and firmly fix the positioning block 23 on the supporting sleeve 21.

The sleeve hole 212 of the supporting sleeve 21 is a conical hole to facilitate ease of inserting the second tool holder 50 into the sleeve hole 212. In addition, the sleeve hole 212 corresponds to the first end portion 51 of the second tool holder 50 in shape and in size to increase a supporting area of the supporting sleeve 21.

The tool holder locking device of the present invention has a simple structure, can be easily assembled and used, and can stably engage with the tool holder.

What is claimed is:

1. A tool holder locking device comprising:
   a base;
   a first support mounted on the base to horizontally hold a first tool holder such that a longitudinal axis of the first tool holder extends horizontally; and
   a second support mounted on the base to vertically hold a second tool holder such that a longitudinal axis of the second tool holder extends vertically;
   wherein the first tool holder has a first end portion and a second end portion respectively located at two opposite ends of the first tool holder, a flange formed between the first end portion and the second end portion and protruding from an annular surface of the first tool holder, a positioning notch recessed in the flange, an orientation notch recessed in the flange and spaced from the positioning notch at an angular interval about the first tool holder longitudinal axis, and a gripper groove radially, with respect to the first tool holder longitudinal axis, recessed in the flange;

wherein the first support has
- a supporting block fixed on the base and having
  - a first end surface;
  - a second end surface opposite to the first end surface;
  - a holding cavity being U-shaped, extending from the first end surface toward the second end surface, and having
    - a top opening formed in a top of the supporting block;
    - a concave curved bottom surface; and
    - two cavity side surfaces, each cavity side surface extending from a respective one of two top edges of the concave curved bottom surface; and
  - the supporting block further having an engaging rib radially, with respect to the first tool holder longitudinal axis, protruding from the holding cavity, having two ends, each of the two ends of the engaging rib extending to a respective one of the two cavity side surfaces of the holding cavity, and corresponding to the gripper groove of the first tool holder in position and in size to engage with the gripper groove of the first tool holder;
- the first support further having a first positioning member fixed on the supporting block, protruding from the concave curved bottom surface of the holding cavity, and corresponding to the positioning notch of the first tool holder in position and in size to engage with the positioning notch of the first tool holder; and
- the first support further having a second positioning member fixed on the supporting block, protruding from the concave curved bottom surface of the holding cavity, and corresponding to the orientation notch of the first tool holder in position and in size to engage with the orientation notch of the first tool holder;

wherein the second tool holder has a first end portion and two driving grooves recessed in an end of the first end portion of the second tool holder and located at two diametrically opposite sides of the second tool holder and communicating with each other; and wherein the second support has
- a supporting sleeve fixed on the base and having
  - a top;
  - a bottom; and
  - a sleeve hole vertically extending through the supporting sleeve; and
- the second support further having a positioning block fixed on the bottom of the supporting sleeve and extending along a radial, with respect to the second tool holder longitudinal axis, direction of the supporting sleeve and across two diametrically opposite sides of the sleeve hole.

2. The tool holder locking device as claimed in claim 1, wherein
the holding cavity of the supporting block has a stage located near the second end surface of the supporting block and protruding inwardly; and
the engaging rib is located between the stage and the first end surface of the supporting block.

3. The tool holder locking device as claimed in claim 2, wherein the stage has a concave curved bottom surface having a diameter gradually larger from the second end surface toward the first end surface.

4. The tool holder locking device as claimed in claim 3, wherein
the first positioning member extends from the first end surface of the supporting block toward the second end surface of the supporting block and has a round end near the second end surface of the supporting block; and
the second positioning member extends from the engaging rib toward the first end surface of the supporting block.

5. The tool holder locking device as claimed in claim 4, wherein the engaging rib of the supporting block has two side walls being gradually away from each other from upper edges of the two side walls of the engaging rib.

6. The tool holder locking device as claimed in claim 5, wherein
the base has a base top surface and a base side surface; and
the supporting block has
an abutting bottom surface extending from a bottom of the second end surface of the supporting block toward the first end surface of the supporting block and held on the base top surface of the base; and
an abutting side surface extending downwardly from an edge of the abutting bottom surface near the first end surface of the supporting block and abutting against the base side surface of the base.

7. The tool holder locking device as claimed in claim 2, wherein
the first positioning member extends from the first end surface of the supporting block toward the second end surface of the supporting block and has a round end near the second end surface of the supporting block; and
the second positioning member extends from the engaging rib toward the first end surface of the supporting block.

8. The tool holder locking device as claimed in claim 7, wherein the engaging rib of the supporting block has two side walls being gradually away from each other from upper edges of the two side walls of the engaging rib.

9. The tool holder locking device as claimed in claim 8, wherein
the base has a base top surface and a base side surface; and
the supporting block has
an abutting bottom surface extending from a bottom of the second end surface of the supporting block toward the first end surface of the supporting block and held on the base top surface of the base; and
an abutting side surface extending downwardly from an edge of the abutting bottom surface near the first end surface of the supporting block and abutting against the base side surface of the base.

10. The tool holder locking device as claimed in claim 1, wherein
the first positioning member extends from the first end surface of the supporting block toward the second end surface of the supporting block and has a round end near the second end surface of the supporting block; and
the second positioning member extends from the engaging rib toward the first end surface of the supporting block.

11. The tool holder locking device as claimed in claim 10, wherein the engaging rib of the supporting block has two side walls being gradually away from each other from upper edges of the two side walls of the engaging rib.

12. The tool holder locking device as claimed in claim 11, wherein the base has a base top surface and a base side surface; and the supporting block has an abutting bottom surface extending from a bottom of the second end surface of the supporting block toward the first end surface of the supporting block and held on the base top surface of the base; and an abutting side surface extending downwardly from an edge of the abutting bottom surface near the first end surface of the supporting block and abutting against the base side surface of the base.

13. The tool holder locking device as claimed in claim 1, wherein the supporting sleeve has two insertion notches recessed in the bottom of the supporting sleeve, each of the insertion notches located at a respective one of the diametrically opposite sides of the supporting sleeve hole, and each of the insertion notches communicating with the sleeve hole; and the positioning block has two ends, each of the two positioning block ends being inserted in a respective one of the two insertion notches and fixed on the supporting sleeve.

14. The tool holder locking device as claimed in claim 13, wherein the supporting sleeve has a sleeve flange formed on the top of the supporting sleeve, wherein the sleeve flange is held on the base and is fixed on the base.

15. The tool holder locking device as claimed in claim 14, wherein the base has a sleeve holder having a holding hole vertically extending through the sleeve holder; and the supporting sleeve is inserted in the holding hole and the sleeve flange is held on a top of the sleeve holder.

16. The tool holder locking device as claimed in claim 15, wherein the sleeve hole is a conical hole having a diameter gradually smaller from the top to the bottom of the supporting sleeve.

17. The tool holder locking device as claimed in claim 14, wherein the sleeve hole is a conical hole having a diameter gradually smaller from the top to the bottom of the supporting sleeve.

18. The tool holder locking device as claimed in claim 13, wherein the sleeve hole is a conical hole having a diameter gradually smaller from the top to the bottom of the supporting sleeve.

19. The tool holder locking device as claimed in claim 1, wherein the sleeve hole is a conical hole having a diameter gradually smaller from the top to the bottom of the supporting sleeve.

* * * * *